(12) United States Patent
Todorovic

(10) Patent No.: US 8,782,896 B2
(45) Date of Patent: Jul. 22, 2014

(54) METHOD FOR THE MANUFACTURE OF AN EJECTOR NOZZLE TUBE

(75) Inventor: Predrag Todorovic, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 969 days.

(21) Appl. No.: 12/566,803

(22) Filed: Sep. 25, 2009

(65) Prior Publication Data

US 2010/0224348 A1    Sep. 9, 2010

(30) Foreign Application Priority Data

Mar. 3, 2009    (DE) .................... 10 2009 011 452

(51) Int. Cl.
| | | |
|---|---|---|
| B05B 15/00 | (2006.01) | |
| F02K 1/36 | (2006.01) | |
| F01D 25/12 | (2006.01) | |
| B64D 33/10 | (2006.01) | |
| F01D 25/18 | (2006.01) | |
| B21D 51/06 | (2006.01) | |
| B21D 53/06 | (2006.01) | |
| B21D 51/10 | (2006.01) | |

(52) U.S. Cl.
CPC .............. *F02K 1/36* (2013.01); *F05D 2250/184* (2013.01); *F05D 2250/183* (2013.01); *F05D 2260/20* (2013.01); *F05D 2250/181* (2013.01); *F05D 2260/601* (2013.01); *F01D 25/12* (2013.01); *B64D 33/10* (2013.01); *F01D 25/18* (2013.01); *B21D 51/06* (2013.01); *B21D 53/06* (2013.01); *B21D 51/10* (2013.01); *F05D 2250/182* (2013.01); *F05D 2250/18* (2013.01); *Y02T 50/675* (2013.01)
USPC .............. 29/890.142; 29/890.039; 29/890.14

(58) Field of Classification Search
CPC .............. B23P 15/26; B21B 1/30; B21B 1/38; B21B 2263/20; B21D 5/00; B21D 11/20; B21D 13/10; B21D 51/06; B21D 51/10; B21D 53/06
USPC ................ 29/890.142, 890.143, 890.14, 463, 29/527.1, 889.2, 889.21, 890.036, 29/890.032, 890.03, 890.052, 890.053
See application file for complete search history.

(56) References Cited

U.S. PATENT DOCUMENTS

| 3,685,612 A | 8/1972 | Bertin et al. |
| 3,861,140 A | 1/1975 | Krabacher |

(Continued)

FOREIGN PATENT DOCUMENTS

| DE | 2333917 | 1/1974 |
| DE | 128559 | 11/1977 |
| EP | 1944475 | 7/2008 |
| FR | 2087076 | 12/1971 |
| GB | 1512785 | 6/1978 |

OTHER PUBLICATIONS

German Search Report dated Mar. 3, 2009 from counterpart German patent application.

(Continued)

*Primary Examiner* — Christopher Besler
(74) *Attorney, Agent, or Firm* — Timothy J. Klima; Shuttleworth & Ingersoll, PLC

(57) ABSTRACT

A method for manufacturing an ejector nozzle tube, includes forming an essentially rectangular plate-type blank 1 to have an undulating configuration on two opposite edge areas 2, 3, subsequently bending the blank around an axis 4, which is arranged centrically and parallel to the edge areas 2, 3, with the edge areas 2, 3 being superposed and subsequently joining the edge areas by point connections 6, providing for the formation of ejector nozzles 5 between the point connections.

12 Claims, 7 Drawing Sheets

(56) References Cited

U.S. PATENT DOCUMENTS

Figure 1:
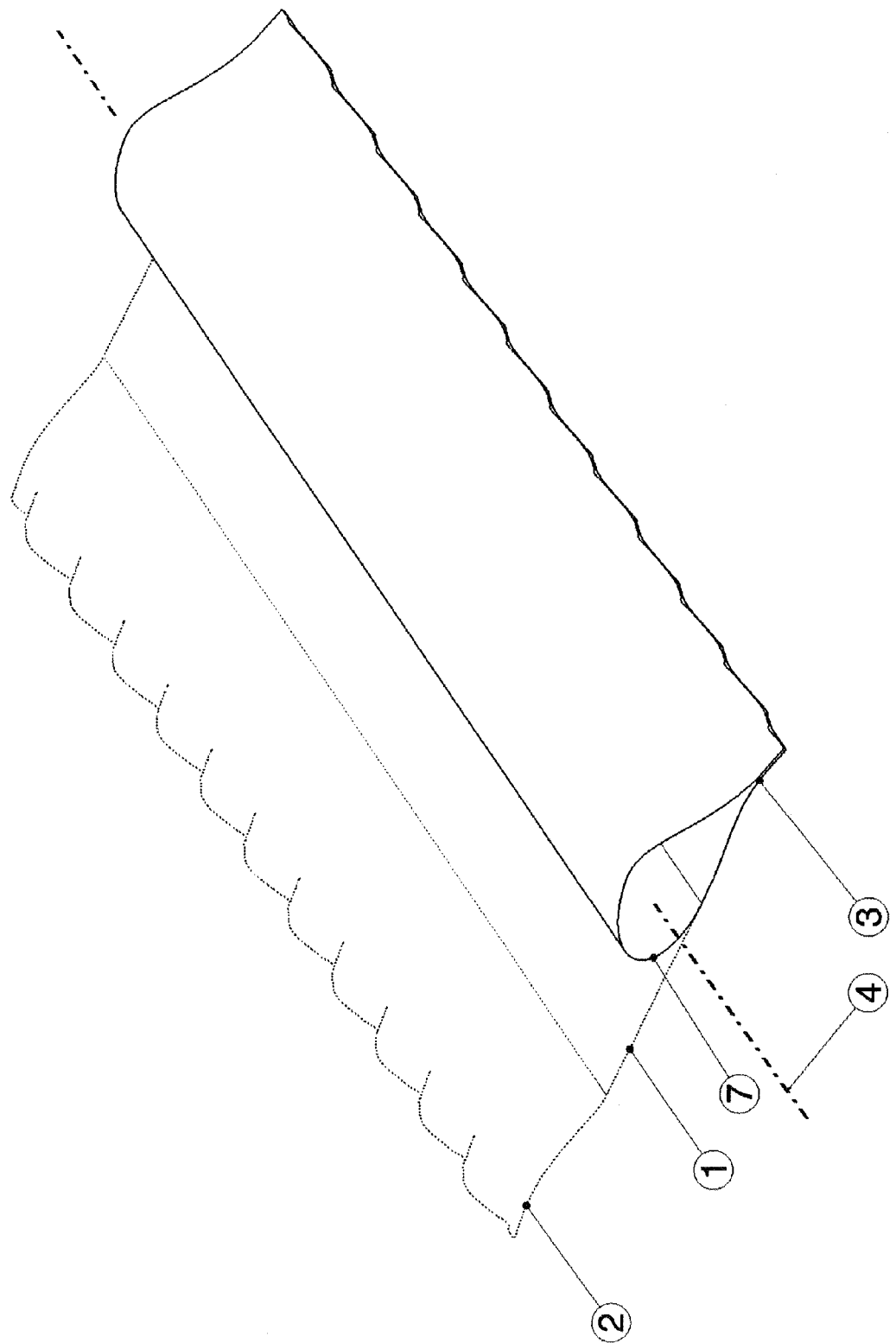

| | | | |
|---|---|---|---|
| 4,763,842 A * | 8/1988 | Dunn | 239/542 |
| 5,106,021 A * | 4/1992 | Gilead | 239/276 |
| 5,520,339 A * | 5/1996 | Kuo | 239/542 |
| 5,785,785 A * | 7/1998 | Delmer et al. | 156/203 |
| 2003/0154720 A1 | 8/2003 | Boehnlein et al. | |
| 2005/0268593 A1 | 12/2005 | Hagshenas | |
| 2007/0255213 A1 * | 11/2007 | Itoh et al. | 604/113 |

OTHER PUBLICATIONS

European Search Report dated Jul. 26, 2010 from counterpart European patent application.

* cited by examiner

METHOD FOR THE MANUFACTURE OF AN EJECTOR NOZZLE TUBE

This application claims priority to German Patent Application DE 10 2009 011 452.1 filed Mar. 3, 2009, the entirety of which is incorporated by reference herein.

This invention relates to a method for the manufacture of an ejector nozzle tube.

Ejector nozzle tubes are used in the state of the art to introduce a second fluid into a first fluid flow, for example to accelerate the latter. Here, the ejector nozzle tube usually extends transversely to the flow direction within a flow duct and is provided on the outflow side with openings enabling the second fluid flow to issue.

The ejector nozzle tube is usually supplied from one side, so that the flow of second fluid within the ejector nozzle tube extends in the longitudinal direction of the latter. This means that the individual exit openings or exit nozzles are differently applied with the second fluid and that a different fluid pressure exists therein. This entails considerable disadvantages in that the second fluid is irregularly introduced along the ejector nozzle tube, thereby failing to produce the desired effects in the first fluid flow throughout the entire cross-section thereof.

In a broad aspect, the present invention provides a method for the manufacture of an ejector nozzle tube which, while being simply designed and easily and cost-effectively applicable, avoids the disadvantages of the state of the art and provides for flow optimization.

According to the present invention, provision is therefore made for an ejector nozzle tube made of a rectangular sheet or plate-type blank. This blank is imprinted on two opposite side or edge areas to produce an undulated structure.

Subsequently, the blank is bent or folded around its center area. Thus, a flow cross-section is produced which is tubular and serves for the introduction of the fluid. In the process, the two undulatingly imprinted or formed rim or edge areas are superposed. Since the edge areas do not fully conformally contact each other, areas forming ejector nozzles are produced by interference or displacement of the undulated structure. Between the ejector nozzles, the edge areas are joined by point connections, for example by spot welding.

In a particularly favorable development of the present invention, provision is made for a part-circular cross-section of the center bending area. Therefore, the ejector nozzle tube according to the present invention can be provided with an aerodynamically optimized, drop-shaped cross-section, which is flat in the area of the superposed edges forming the ejector nozzles and part-circular at the inflow side. This provides for a flow optimization of the above-described first fluid flow. The latter is only insignificantly disturbed by the ejector nozzle tube according to the present invention. Thus, provision is made for a laminar flow over a wide range along the surface of the ejector nozzle tube according to the present invention, with no undesired swirling or aerodynamic drag occurring.

According to the present invention, it can be particularly favorable to form the undulated edge areas with different geometry relative to each other. This enables the individual ejector nozzles formed by superposing the two edge areas to be specifically shaped. Thus, provision is also made for alternatingly varying individual ejector nozzles as regards the jet exit direction, with the nozzles being alternatingly upwardly or downwardly orientable.

According to the present invention, the trailing edge of the edge areas can be rectilinear or structured. Accordingly, undulation or similar can also be provided on the trailing edges, thereby enabling the individual ejector nozzles to be saliently or recessedly arranged relative to each other upon superposing the two edge areas. It can thus be favorable to provide ejector nozzle rows which are offset relative to each other.

According to the present invention, the inventive ejector nozzle tube is preferably used in a flow duct of a heat exchanger to accelerate the flow of the first fluid through the flow duct of the heat exchanger by introducing the second fluid into the ejector nozzle tube if the flow velocity in the flow duct is not sufficient.

Figure 2:
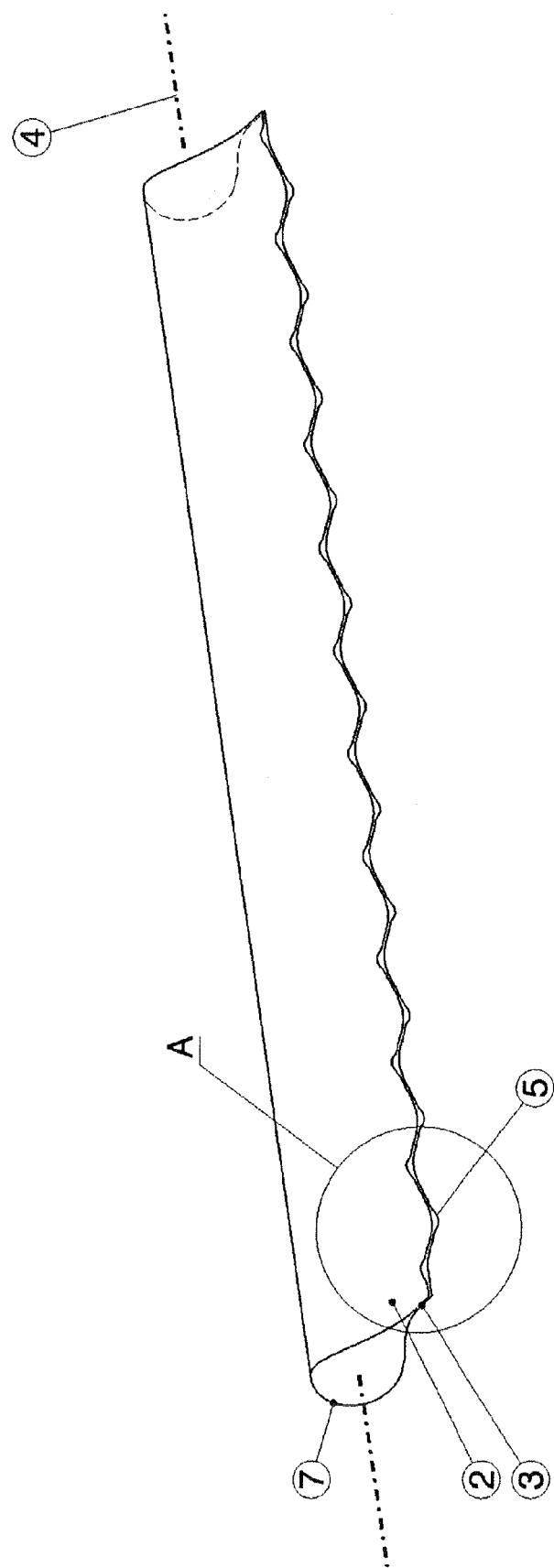
Figure 3:
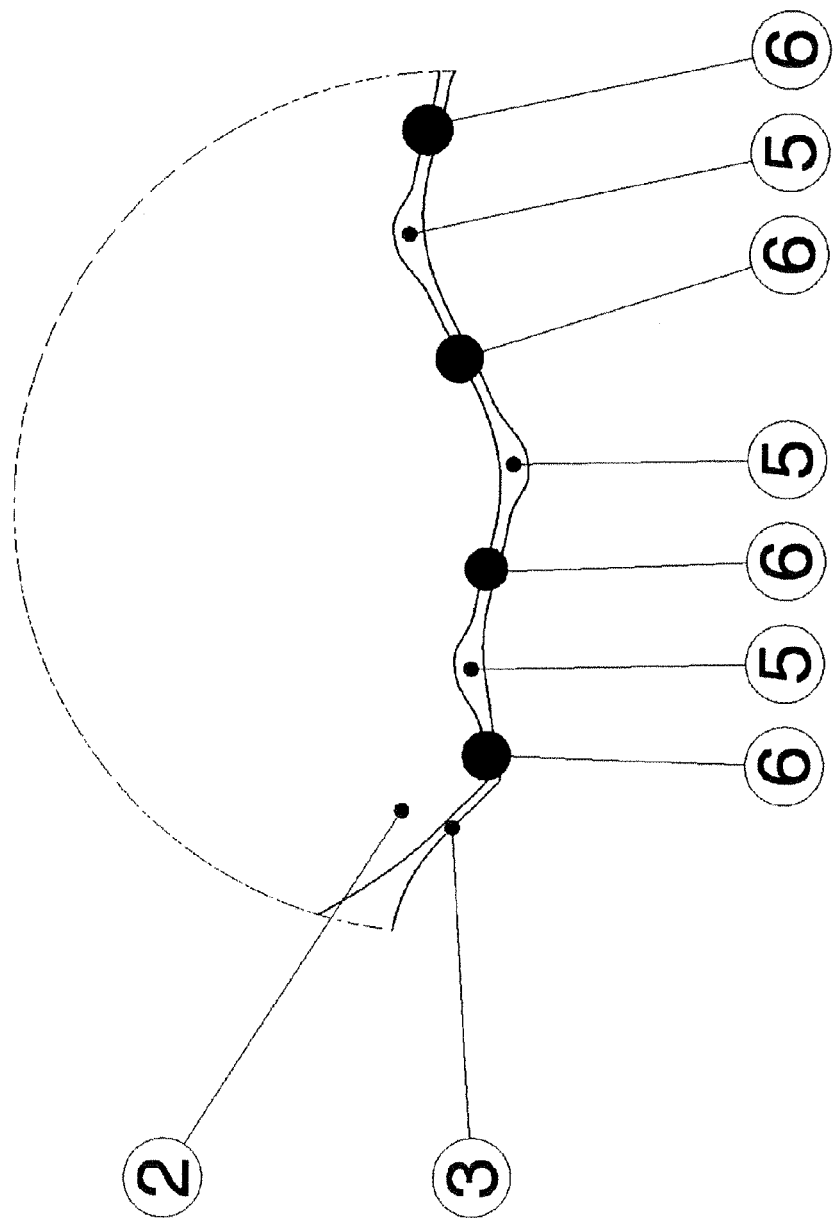
Figure 4:
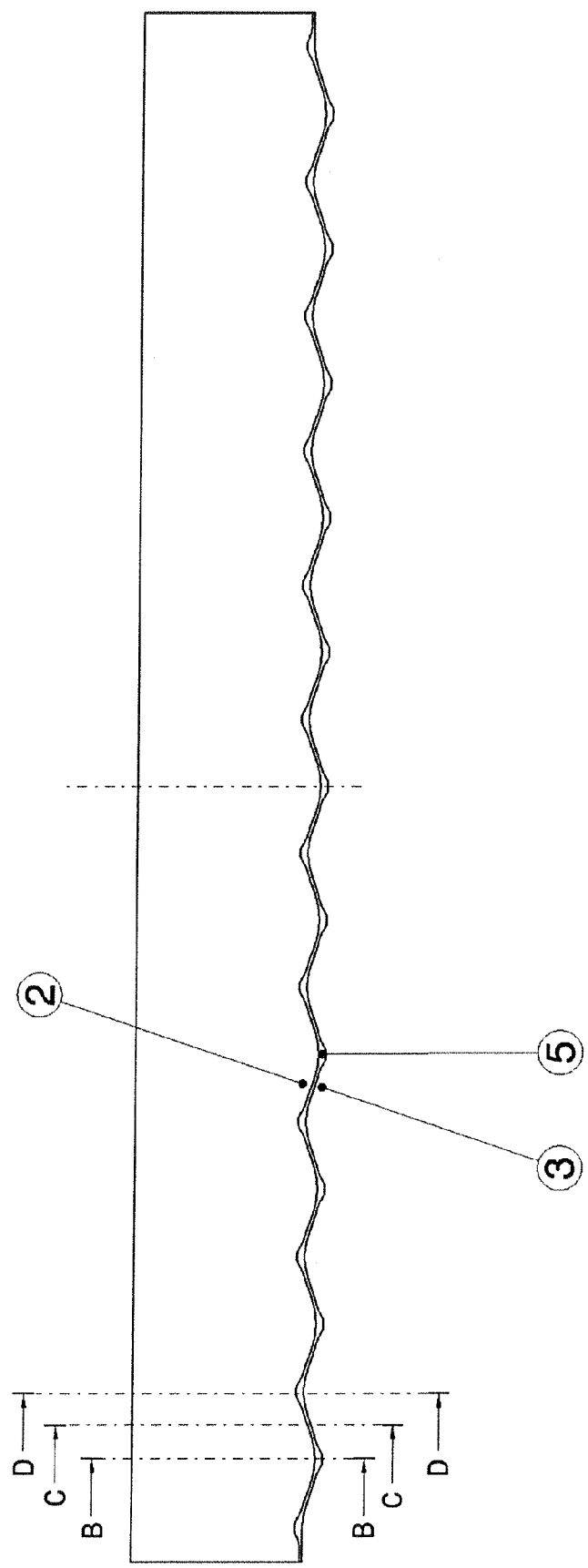

In the following the present invention is more fully described in light of the accompanying drawings showing a preferred embodiment. In the drawings, FIG. 1 is a simplified perspective representation of the manufacturing process, FIG. 2 is a perspective representation, analogically to FIG. 1, of the finished ejector nozzle tube, FIG. 3 is a detailed view, showing detail A of FIG. 2, FIG. 4 is a top view of the edge area as per FIGS. 1 and 2, FIGS. 5-7 are sectional views along the lines B-B (FIG. 5), C-C (FIG. 6) and D-D (FIG. 7).

The ejector nozzle tube according to the present invention is made of an essentially rectangular sheet or plate-type blank 1. This blank has edge areas 2, 3 which are arranged opposite to each other. Firstly, these are provided with an undulated imprint. The trailing edge of the edge areas can either be rectilinear or undulated, as shown in FIG. 4. Preferably, the undulated imprint or deformation, which is shown in FIG. 1, is selected such that individual undulation peaks or undulation valleys are produced in the longitudinal direction of the ejector nozzle tube, with the two edge areas 2, 3 being not fully conformally dimensioned or formed relative to each other.

In a further operation, the blank 1 is bent or folded in its center area to produce, as shown in the figures, the part-circular cross-section around an axis 4, with the latter assuming the position of a center axis at least for the inflow area of the injector nozzle tube.

Figure 5:
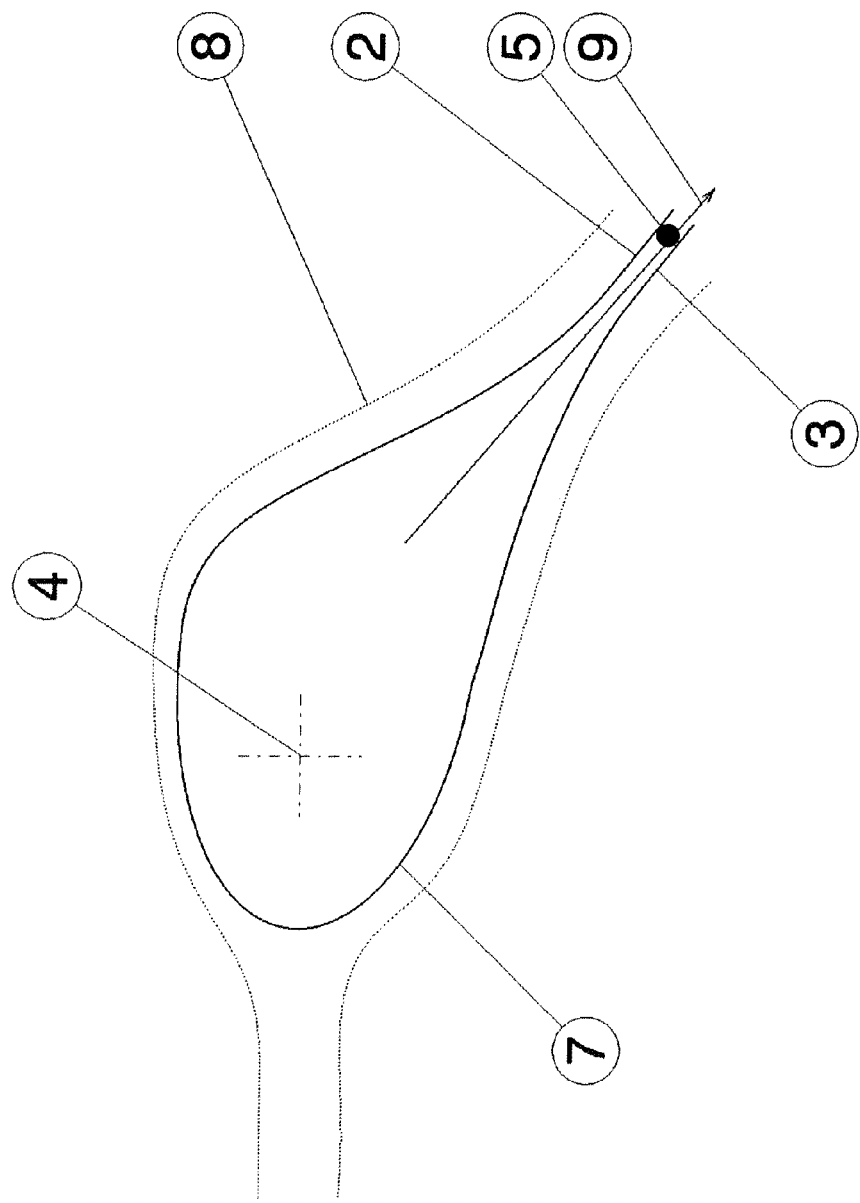

Due to the undulated structure of the two edge areas 2, 3, superposition of the latter produces zones in which the two edge areas converge toward or contact each other. These zones are joined to each other by point connections 6 (for example spot welding). Between the point connections 6, zones occur in which the two edge areas 2, 3 diverge away from and do not conformally contact each other, but are apart from each other. Thus, provision is made for the formation of ejector nozzles 5 (see FIG. 3, for example). The flow introduced into the interior of the ejector nozzle tube can issue through these ejector nozzles 5, as shown in FIGS. 5 and 7 (secondary flow 9). The structuring enables the exit direction of the individual ejector nozzles 5 to be varied, so that the ejector nozzles 5 are, for example, alternatingly oriented slightly upward or downward, respectively. Furthermore, the distance of the exit cross-section of the ejector nozzles from the axis 4 is variable, as conveyed by FIG. 4. Consequently, individual nozzles will project farther than other ejector nozzles 5, which are slightly setback.

Figure 6:
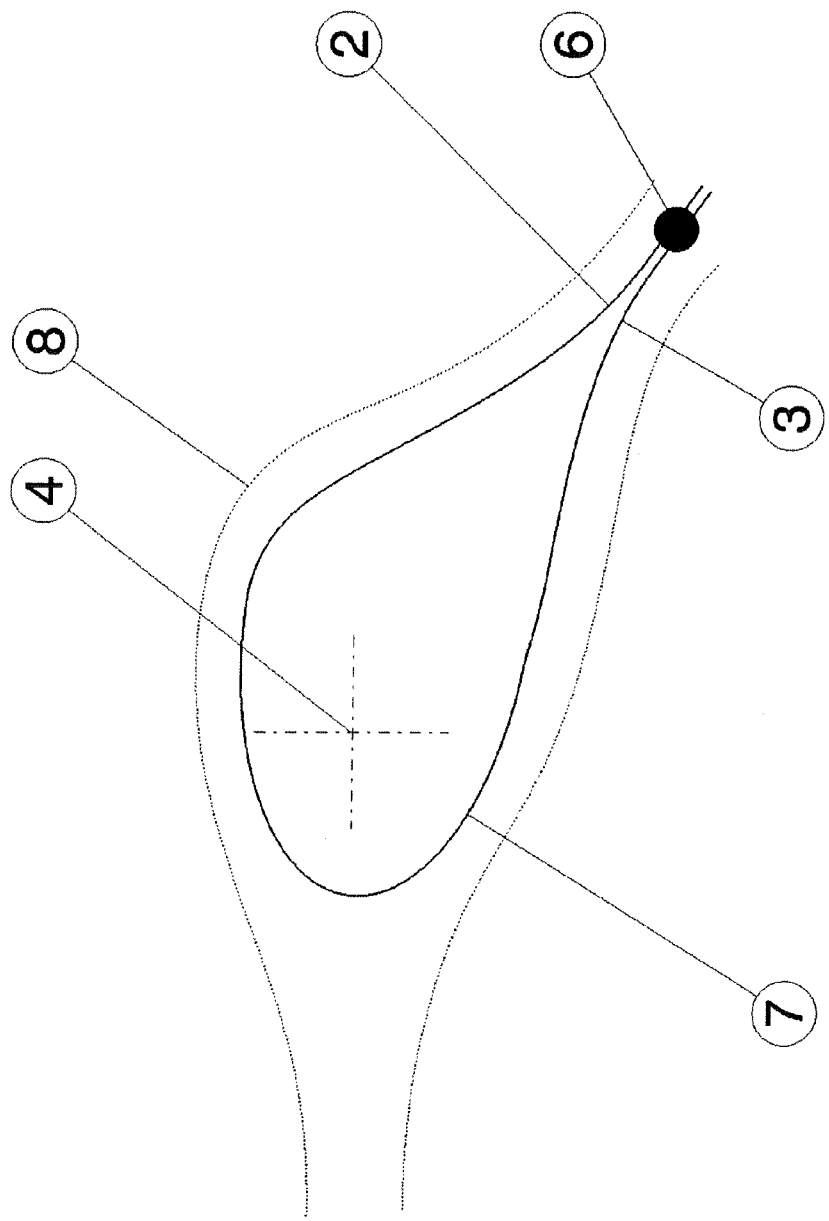
Figure 7:
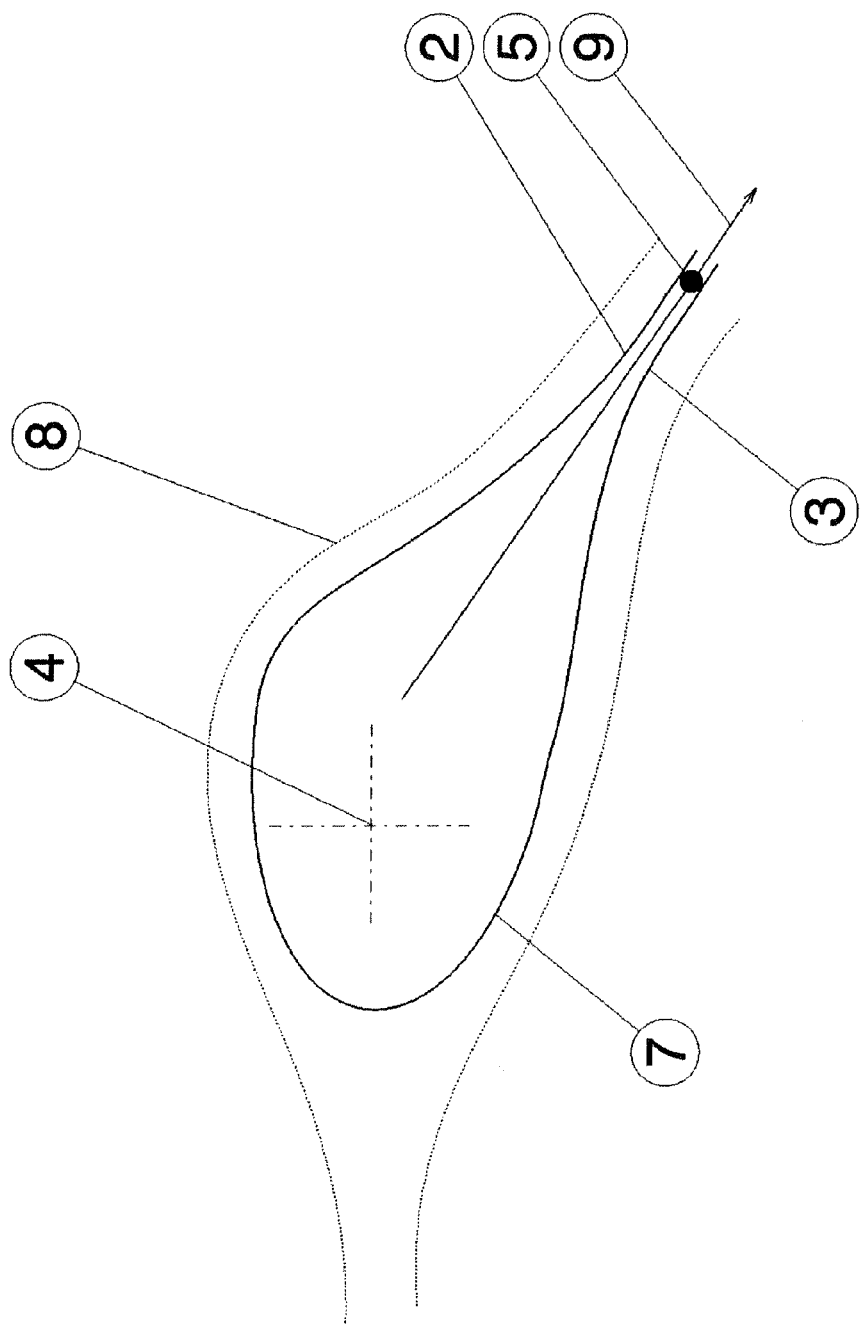

In FIGS. 5-7, reference numeral 8 indicates the main flow enveloping the ejector nozzle tube. The aerodynamically favorable design provides for an optimized course of the main flow 8.

The ejector nozzle tube according to the present invention is particularly suitable for application in oil coolers of aircraft. Such oil coolers are cooled by the inflowing air. If the aircraft is in a phase of low airspeed, for example during taxiing or in the initial take-off phase, the quantity of air flowing through the oil cooler is inadequate. Accordingly, the cooling effect produced is only low. Therefore, is its particularly advantageous to provide the flow duct of the oil cooler with an ejector nozzle tube according to the present invention. Introducing a secondary flow enables the main flow to be correspondingly accelerated, thereby providing for an adequate cooling effect by the air additionally supplied by the secondary flow, in spite of the low inflow velocity.

The acceleration effect by the flow issuing from the ejector nozzles results from friction with the particles of the main flow. Since the exit velocity from the ejector nozzles is far higher than the velocity of the main flow, the particles of the main flow are entrained and thereby accelerated. This leads to a suction effect which accelerates the entire main flow.

According to the present invention, the effect described is achieved with an ejector nozzle tube of very simple design, which is cost-effectively producible with simplest means. It is only required that a blank be imprinted, folded and joined by individual spot welds. These operations are implementable with minimum production effort.

The cross-sectional shape according to the present invention, which is an airfoil-type profile, provides for particular optimization of flow. The configuration of the edge area, and the ejector nozzles resulting therefrom, provides for an increase in efficiency over that of state-of-the-art tubular ejector nozzle tubes. This increase is provided in particular by the main flow 8 (see FIGS. 5 and 7) passing in direct contact with and essentially parallel to the secondary flow 9 exiting from the ejector nozzles 5.

Besides simplified manufacture (compared with the state of the art), substantial material saving is obtained in that a simple sheet bending part can be used, instead of an expensive tubular design with welded-on tube fittings. The already described increase in efficiency of more than 70% and the producibility of more than 10% higher volumes of secondary flow than in the state of the art yields an increase in efficiency of 80 to 90% for an oil cooler of the type described.

LIST OF REFERENCE NUMERALS

1 Blank
2,3 Edge area
4 Axis
5 Ejector nozzle
6 Point connection
7 Center bending area
8 Main flow
9 Secondary flow

What is claimed is:

1. A method for manufacturing and using an ejector nozzle tube, comprising:
   forming an essentially rectangular sheet blank to have an undulating configuration on each of two opposite edge areas;
   forming the undulated opposite edge areas with different geometries relative to each other;
   subsequently bending the sheet around an axis, which is arranged centrally and parallel to the edge areas to superpose the edge areas to form an exterior surface having an aerodynamic drop shaped cross-section having a rounded inflow side and a flattened ejector side; and
   subsequently joining portions of the superposed edge areas which converge toward each other with point connections to form ejector nozzles between the point connections from portions of the superposed edge areas which diverge from each other to form the elector nozzle tube;
   wherein the different geometries form ejector nozzles having exit directions offset with respect to each other;
   positioning the ejector nozzle tube in a flow duct of a heat exchanger and passing a main flow through the flow duct and around the aerodynamic drop shaped exterior surface from the rounded inflow side to the flattened ejector side;
   introducing a secondary flow through the ejector nozzles into the main flow duct at a higher velocity than a velocity of the main flow to accelerate the main flow.

2. The method of claim 1, and further comprising forming a center bending area to have a part-circular cross-section.

3. The method of claim 2, wherein the edge areas each have a trailing edge which is chosen from a rectilinear trailing edge and an undulated trailing edge.

4. The method of claim 2, wherein the edge areas are structured.

5. The method of claim 1, wherein the ejector nozzles are arranged in rows which are offset relative to each other and with respect to the axis.

6. The method of claim 1, wherein the edge areas each have a trailing edge which is chosen from a rectilinear trailing edge and an undulated trailing edge.

7. The method of claim 1, wherein the edge areas are structured.

8. The method of claim 1, wherein the joining step is by welding.

9. The method of claim 2, and further comprising forming a direct path between the center bending area and exits of the ejector nozzles.

10. The method of claim 2, wherein the ejector nozzle tube is used in a flow duct of a heat exchanger.

11. A method for manufacturing and using an ejector nozzle tube, comprising:
   forming an essentially rectangular sheet blank to have an undulating configuration on each of two opposite edge areas;
   forming the undulated opposite edge areas with different geometries relative to each other;
   subsequently bending the sheet around an axis, which is arranged centrally and parallel to the edge areas to superpose the edge areas; and
   subsequently joining portions of the superposed edge areas which converge toward each other with point connections to form ejector nozzles between the point connections from portions of the superposed edge areas which diverge from each other to form the ejector nozzle tube,
   wherein the ejector nozzle forms an open area open to an interior of the ejector nozzle tube for a secondary flow from the ejector nozzle tube, the open area for the secondary flow occupying substantially all of a length of the superposed edge area;
   wherein the different geometries form ejector nozzles having exit directions offset with respect to each other; and
   positioning the ejector nozzle tube in a flow duct of a heat exchanger and passing a main flow through the flow duct and around an exterior surface of the ejector nozzle tube.

12. A method for manufacturing and using an ejector nozzle tube, comprising:
   forming an essentially rectangular sheet blank to have an undulating configuration on each of two opposite edge areas;
   forming the undulated opposite edge areas with different geometries relative to each other;
   subsequently bending the sheet around an axis, which is arranged centrally and parallel to the edge areas to superpose the edge areas; and
   subsequently joining portions of the superposed edge areas which converge toward each other with point connections to form ejector nozzles between the point connections from portions of the superposed edge areas which diverge from each other, respective planes tangent to the point connections being non-parallel, to form the ejector nozzle tube;
wherein the different geometries form ejector nozzles having exit directions offset with respect to each other; and
positioning the ejector nozzle tube in a flow duct of a heat exchanger and passing a main flow through the flow duct and around an exterior surface of the ejector nozzle tube.

* * * * *